United States Patent [19]

Foote, Jr. et al.

[11] Patent Number: 4,821,066
[45] Date of Patent: Apr. 11, 1989

[54] NONIMPACT PRINTER

[75] Inventors: James C. Foote, Jr., York; Frank Castrignano, Fairport; Robert D. Huot, Pittsford, all of N.Y.

[73] Assignee: Eastman Kodak Company, Rochester, N.Y.

[21] Appl. No.: 158,953

[22] Filed: Feb. 22, 1988

[51] Int. Cl.[4] .............................................. G03G 15/01
[52] U.S. Cl. ..................... 355/14 R; 355/4; 355/16; 346/157
[58] Field of Search ............ 355/16, 4, 3 TR, 14 TR, 355/14 R, 3 SH, 3 BE; 357/157; 101/248

[56] References Cited

U.S. PATENT DOCUMENTS

| | | | |
|---|---|---|---|
| 3,602,589 | 8/1971 | Dietz | 355/14 R |
| 3,785,730 | 1/1974 | Weber et al. | 355/16 |
| 4,025,186 | 5/1977 | Hunt et al. | 355/14 R |
| 4,198,155 | 4/1980 | Silvergerg | 355/16 |
| 4,330,194 | 5/1982 | Murakami | 355/3 R |
| 4,407,580 | 10/1983 | Hashimoto | 355/3 TR |
| 4,410,263 | 10/1983 | Gustafson et al. | 355/3 TR |
| 4,477,176 | 10/1984 | Russel | 355/3 TR |
| 4,531,828 | 7/1985 | Hoshino | 355/3 SH |
| 4,556,311 | 12/1985 | Tagoku | 355/14 R |
| 4,577,953 | 3/1986 | Narukawa | 355/3 BE |
| 4,643,560 | 2/1987 | Morse | 355/3 R |
| 4,712,906 | 12/1987 | Bothner et al. | 355/3 TR |

Primary Examiner—Arthur T. Grimley
Assistant Examiner—J. Pendegrass
Attorney, Agent, or Firm—Leonard W. Treash

[57] ABSTRACT

A nonimpact printer, for example, a color printer, of the type having an endless movable web on which two or more images are formed by an electronic printhead and transferred in registration provides reliable registration using perforations along an edge of the web. A first sensing means, for example, a printhead sprocket, senses an edge of the perforations and controls the printhead. A second sensing means, for example, a transfer sprocket also senses an edge of the perforations and controls transfer. Error in image formation because of error in perforation formation is substantially corrected by using the same perforation for transfer that is used for printing.

18 Claims, 4 Drawing Sheets

NONIMPACT PRINTER

FIELD OF THE INVENTION

This invention relates to a nonimpact printer of the type which forms a plurality of images on an endless web and then transfers those images in registration to a transfer surface. For example, the invention is particularly usable in a color printer.

BACKGROUND OF THE INVENTION

U.S. Pat. No. 4,712,906 issued Dec. 15, 1987 to R. Borruso and J. Butler shows a color printer having an electrophotographic endless web entrained about a series of rollers. Electrostatic images representing color components of a desired multicolor image are formed by uniformly charging the web and exposing it using an LED printhead. Consecutive images (or pairs of images) are toned with different colored toners and then transferred in registration to a transfer surface brought into contact repeatedly with the images by a transfer drum.

Registration of the color images is achieved in part by an encoder which monitors the angular position of a roller associated with the printhead. The encoder triggers exposure of the web according to that angular position. The printhead roller is connected by gearing or a timing belt to the transfer drum to assure that the transfer surface is presented in registration with the beginning of the first image. The accuracy of placement of subsequent images on top of the first image is dependent upon consistency in the movement of the web between the printhead and the transfer station. With this structure, small errors associated with slippage of the web, errors in the drive train between the transfer drum and the printhead roller, and the like, cause small errors which accumulate over the course of formation of a set of multicolor images. While these errors are relatively small and not unacceptable for much color work, they prevent forming images of highest quality with ordinary web drive controls.

U.S. Pat. No. 4,025,186 shows an endless web electrophotographic member having a series of perforations along one edge which perforations are sensed to control actuation of work stations along the web. U.S. Pat. No. 4,477,176 shows a similar approach for controlling superimposed multiple image apparatus, for example, a multicolor image copier.

SUMMARY OF THE INVENTION

It is the object of this invention to provide a nonimpact printer, for example, a color printer, generally of the type having an endless movable web upon which two or more images are formed by a printhead in response to an electronic signal and transferred in registry but in which registration of those images is much improved.

These and other objects are accomplished by providing a web which has a series of perforations along one edge. A means for controlling the printhead includes first sensing means for sensing the leading or trailing edge of each perforation as it passes a predetermined position associated with the printhead and means for controlling actuation of the printhead in response to the sensing means. A means for controlling presentation of the transfer surface to the toner images includes a second sensing means for sensing each perforation as it passes a predetermined position associated with the transfer surface and means for positioning the transfer surface relative to the toner images in response to sensing of each perforation.

According to a preferred embodiment the first sensing means includes a printhead sprocket positioned to engage an edge of each perforation and the second sensing means is a transfer sprocket positioned to engage an edge of each perforation. The teeth of the two sprockets control image formation and transfer according to one or both edges of the same perforation. A tooth of each sprocket engages an edge of a perforation substantially all the time. Errors in image formation due to perforation formation error are corrected because the same perforation controls transfer.

With this apparatus, irregularities in movement of the web relative to the image forming means or between the image forming means and the transfer drum do not show up as errors in registration, giving a registration suitable for very high quality color reproduction.

According to another preferred embodiment the transfer means is a drum which is driven by the main drive of the printer and in turn supplies the driving force for the web through engagement of the transfer sprocket with the perforations. This assures force the teeth of the transfer sprocket are consistently engaging the leading edge of the appropriate perforation. It also has the advantage that the substantial mass of the transfer drum provides a stabilizing effect on the movement of the web.

BRIEF DESCRIPTION OF THE DRAWINGS

In the detailed description of the preferred embodiment of the invention presented below reference is made to the accompanying drawings, in which.

BEST MODE OF CARRYING OUT THE INVENTION

Figure 1:
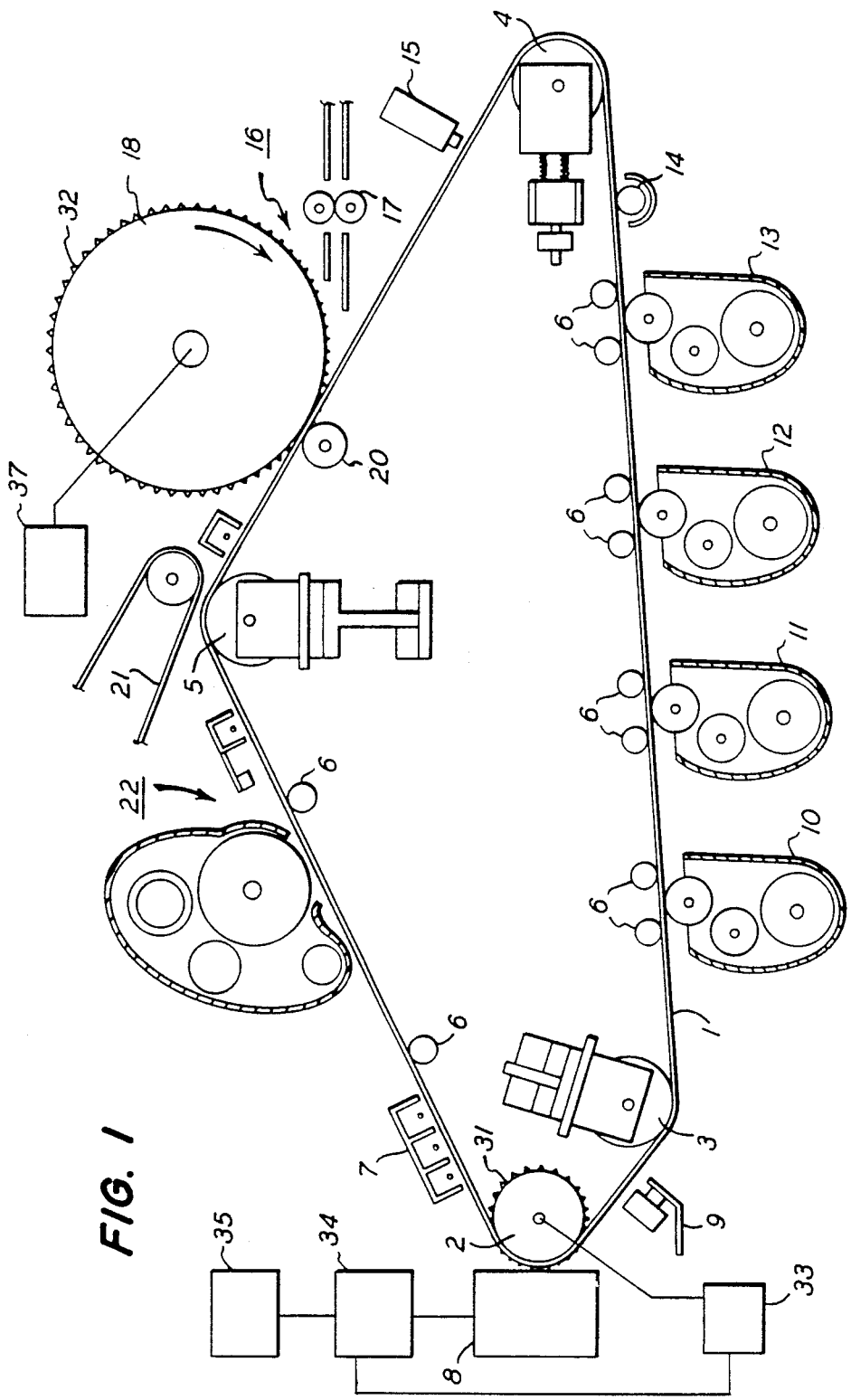
FIG. 1 is a schematic side view of a printer or copier constructed according to the invention, with many parts eliminated for clarity of illustration.

According to FIG. 1, a film core portion of a copier or printer, includes an endless movable web, for example, an electrophotographic web 1 entrained about a series of primary rollers 2, 3, 4 and 5 and other supporting structure, for example, skis 6.

The web 1 is driven by means discussed below through a series of electrophotographic stations, generally well-known in the art. More specifically, a uniform charge is laid down on the electrophotographic web 1 at a charging station 7. The uniformly-charged web moves around printhead roller 2 which is directly opposite an LED printhead 8 which LED printhead exposes the web 1 in a manner well-known in the art and as more particularly described below. The web then moves into operative relation with an electrometer 9 which senses either the level of charge originally placed on the web or the level of a charge existing after exposure of the web by LED printhead 8.

The web 1 then moves into operative relationship with a series of toner stations 10, 11, 12 and 13. Each image created by exposure using LED printhead 8 is toned by one of the stations 10, 11, 12 or 13. After being toned, the web 1 passes a magnetic scavenger 14 which removes excess iron particles picked up in the toning process as is well known in the art. After the electrostatic image has been toned the web passes under a densitometer 15 which measures the density of the toner image or of a specially toned area or areas to be used to control one or more aspects of the process. The toner image then proceeds to a transfer station 16 where the image is transferred to a transfer surface. The transfer surface may be one surface of a copy sheet which has been delivered by a copy sheet feeding mechanism 17 to the transfer station 16.

The transfer station includes a large transfer drum 18 which includes a means such as vacuum holes 19 (see FIG. 4) for securing the copy sheet thereto for repeated presentations to web 1; see also U.S. Pat. No. 4,712,906 cited above. The transfer drum 18 cooperates with web 1 to incrementally bring the transfer surface and the toner image into transfer relation so that the toner image is transferred to the transfer surface. As is well known in the art, this is generally accomplished under the presence of an electric field which mayb be created by biasing the transfer drum compared to a conductive layer of the web or to a backing roller 20 for the web; see, for example, U.S. Pat. No. 3,702,482.

When the apparatus is operating in a multi-image mode, for example, a multicolor mode, consecutive images or pairs of images are toned with different colored toners using the different toning stations 10–13. These consecutive images are transferred in registry to the transfer surface as it repeatedly is brought into transfer relation with the web 1 by the drum 18. After the transfer operation is complete the copy sheet is allowed to follow the web, for example, by removing the vacuum holding it to the drum 18 or by stripping the sheet with a claw or other conventional stripping mechanism, and the copy sheet is separated from the web with the aid of sheet transport mechanism 21 and is transported to a fuser, not shown, as is well known in the art. The web is then cleaned by the application of a neutralizing corona and a neutralizing erase lamp and a magnetic brush cleaning mechanism all located at a cleaning station 22.

The quality of the resulting multicolor image on the copy sheet as it exits this system to go to the fuser, is very much dependent upon the registration of the images at the transfer station 16. This, in turn, is dependent upon coordination between the LED printhead 8, the moving web 1 and the transfer drum 18. Registration error of even a small magnitude results in loss of resolution and may result in a shift in the hue of colors that result from the combination of two different toners. Original location of the copy sheet on the transfer drum 18 by the sheet feeding mechanism 17 is considerably less critical since that affects only the location of the image on the sheet itself and not the quality of the image itself.

Coordination between printhead, web and transfer drum is provided, in part, by placing a series of perforations 30 along one edge of the web 1. A first or printhead sprocket 31 is positioned to engage the perforations and rotate with the web as it moves through operative relationship with printhead 8. An encoder 33 monitors the angular position of printhead sprocket 31 creating a signal indicative of that position. It is also indicative of the location of the edge of the perforation in contact with the sprocket. This signal is fed into a printhead drive and control unit 34 which also receives a picture input signal from data input device 35 which may be, for example, a scanner, a computer, a data storage device or the like. The printhead drive and control unit 34 actuates LED printhead 8 according to the angular position of the printhead sprocket 31. It thus exposes a portion of the web associated with the intrack separation between consecutive engaged edges of the perforation.

Figure 2:
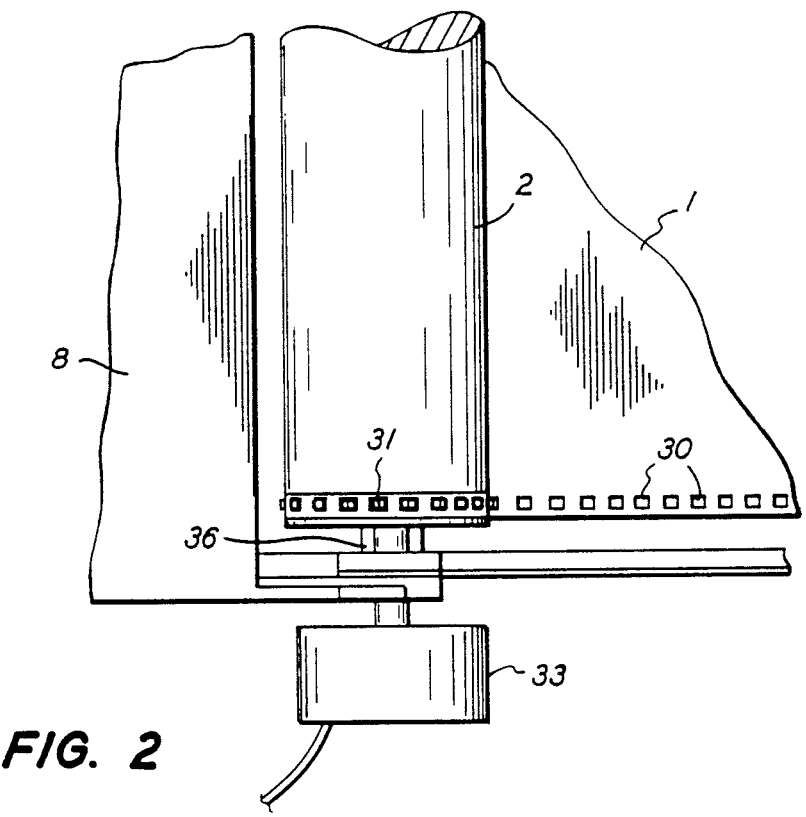
FIGS. 2 and 3 are top view and side views respectively of printhead and printhead roller portions of the apparatus shown in FIG. 1.
Figure 3:
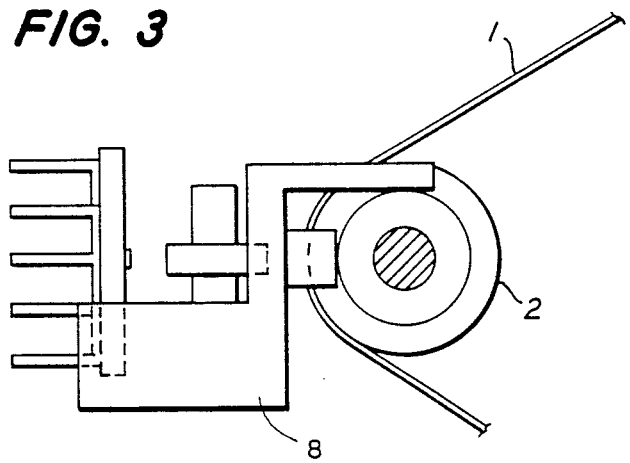
Figure 6:
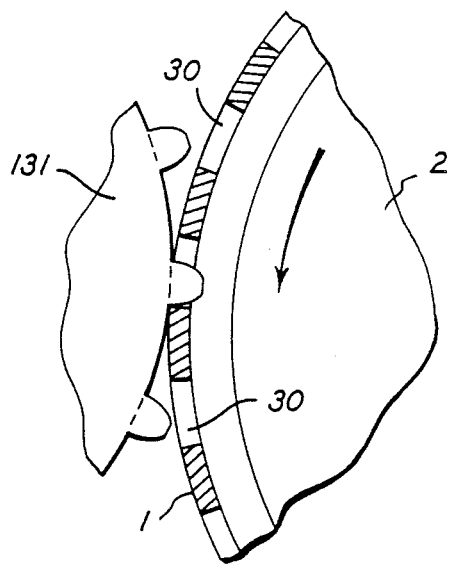
FIGS. 6 and 7 are side views of an alternative embodiment of the printhead roller portion of FIG. 1.
Figure 7:
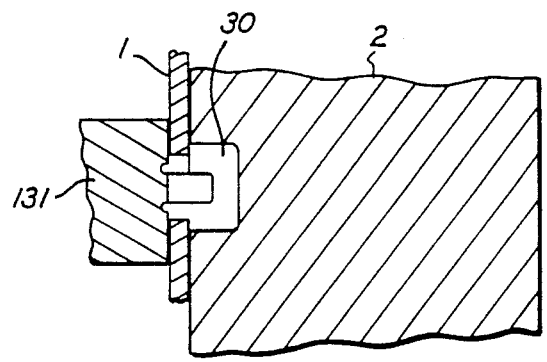

It is important that the angular position of first sprocket 31 be representative of the exact position of web 1 as represented by the perforations when it is being exposed by printhead 8. This can be accomplished by either assuring that the sprocket teeth are constantly engaging the front edge of the perforations or the rear edge of the perforations. According to FIG. 2, to assure engagement with the rear or upstream edge of the perforation a tendency retard mechanism 36, well known in the mechanical arts generally, is applied to printhead roller 2, and sprocket 31 is fixed to the end of printhead roller 2. This tendency retard is not necessary for most applications because the friction associated with the printhead roller 2 will usually maintain the teeth of printhead sprocket 31 against the rear edge of the perforation. Alternatively, the sprocket may be driven to the front or downstream edge of the perforation by a positive tendency drive. This can be accomplished by mounting the printhead sprocket 131 outside of the loop of web 1 as shown in FIGS. 6 and 7. An external motor with a slip clutch to provide a tendency drive can also be used. In this embodiment the pitch of the sprocket is made slightly less than the pitch of the web perforations and the traction between the web itself and the area of the sprocket adjacent the teeth (see FIG. 7) overdrives the teeth to force them to the front edge or downstream edge of the perforation. Other tendency drives and retards well known in the mechanical arts can be used.

It is known to use an encoder to monitor the angular position of a roller in a machine of this type to control the exposure of an LED printhead, see U.S. Pat. No. 4,712,906, cited above. Such arrangements prevent irregularities in an image due to substantial variations in web speed at the printhead. However, errors of a much smaller nature continue to show up with such devices when images are superimposed at a prior art transfer station, the movement of which is controlled only by internal gearing or timing belt connection with the printhead roller. They are not noticeable for most color work, but in high quality applications result in a noticeable loss of resolution or change of hue from inexact superposition of images. These errors are virtually eliminated by providing a second or transfer sprocket 32 controlling the relative positions of the transfer surface and the web.

Figure 4:
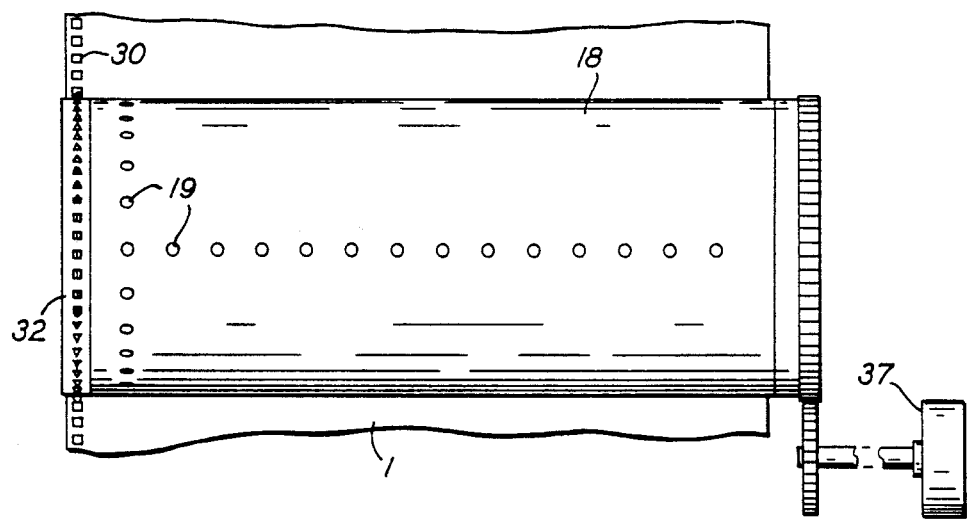
FIGS. 4 and 5 are top view and side views of the transfer portions of the apparatus shown in FIG. 1.
Figure 5:
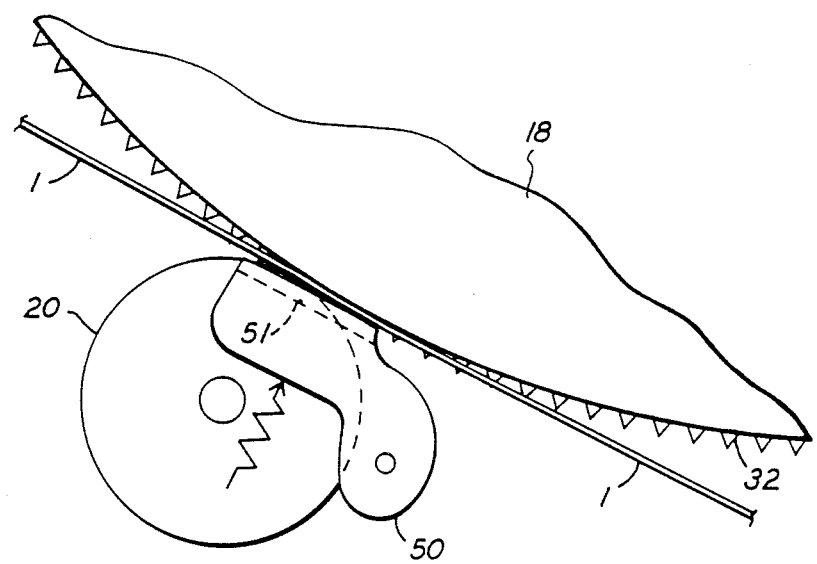

According to FIGS. 1, 4 and 5, transfer or second sprocket 32 is fixed to one end of transfer drum 18. The transfer drum 18 supplies the power to move the web 1 through this engagement. More specifically, transfer drum 18 is driven by a motor 37 causing it to rotate in a clockwise direction as shown in FIG. 1. Rotation of transfer drum 18 causes the teeth of second sprocket 32 to engage the front or downstream edge of perforations 30 thereby driving the web 1.

The pitch of the teeth of the first and second sprockets should be "substantially" the same. However, consistent with known principles of sprocket drive, to ensure that only the desired tooth is controlling the relative location of the transfer surface and the toner image on the web, the pitch of the transfer sprocket is made slightly greater than the pitch of the perforations. To similarly ensure that only the proper tooth of printhead sprocket 31 is engaging the web and controlling exposure, the pitch of sprocket 31 in the embodiment in which it engages the rear of the perforation is made slightly less than that of the perforations. The difference in sprocket pitch is determined from film perforation tolerances.

In theory, the web engages an edge of both sprockets at substantially all times. However, there is a very short distance or time as one tooth takes over edge engagement of the next perforation while the preceding tooth is leaving, that none or both may be engaging an edge for an instant. This has not shown to give errors in registration. The engaging tooth of the printhead sprocket controls image location for the portion of the web being exposed while it is so engaged. The same is true for the engaged tooth of the transfer sprocket. The portion of the web is the same if the teeth are engaging the same perforation edge. If the size of the perforation is within very tight tolerance, the portions of the web controlled by engaging opposite edges of the perforation with the two sprockets are not the same, but are comparable. Excellent registration is maintained in this case as well. The portion, in each instance, should have an in-track dimension equal to the distance between consecutive engaged perforation edges.

The circumference of the transfer drum should be equal to the distance between the same points in consecutive images that are to be superimposed. Therefore the circumference of the web 1 should be equal to an integer multiple of the circumference of the transfer drum. Obviously, the total number of perfs in the web must be equal to an integer multiple of the number of teeth on the transfer sprocket 32. Although not necessary, it is also very desirable to have the transfer sprocket have a number of teeth that is an integer multiple of the teeth on the printhead sprocket. This guarantees that the same tooth will control the exposure of the same points in consecutive images, thereby at least partially reducing exposure problems associated with tolerances in the first sprocket. For example, the belt may have 324 perforations, while the second sprocket has 108 teeth and the first sprocket has 18 teeth.

Web perforation technology is highly developed. That is, perforation formation can be done quite accurately. However, small errors in the spacing between perforations are inevitable. For example, error in perforations in a web of the type described can be kept within + or −0.015 mm. This much error in location of the images in a quality color printer would be acceptable for some purposes, but quite noticeable in others. Furthermore, if an error of this magnitude occurs several times in the same direction in the course of, say, four images, the error is said to be "cumulative" and would be quite objectionable when superposing the first and fourth images. With the system used herein, the perforation error at the printhead sprocket is automatically corrected at the transfer sprocket, because the transfer sprocket engages the same, slightly off, perforation, and the "cumulative pitch error" does not contribute error in registration. It is thus immune to cumulative pitch error.

It is theoretically preferable that both the transfer and printhead sprockets engage the same edge of the perforation. However, perforation error is rarely found in the relation between leading and trailing edge of a given perforation. The primary source of error is in the separation between perforations. Thus, the approach in FIG. 1, with the transfer sprocket engaging the leading edge of the perforation as it drives the web and the printhead sprocket being driven by the trailing edge produces high quality in-track registration.

Driving the web with the transfer drum 18 has the important advantage of providing a large inertia source of power which helps maintain uniform movement of the web and at the same time forces the teeth on the transfer sprocket 32 firmly against the downstream or front edge of the perforation. However, the web can be driven by one of the other rollers with the transfer sprocket engaging the trailing edge of the perforation. Alternatively, direct power can be supplied to the transfer drum 18 and a tendency drive applied to the printhead roller with enough force to assist in driving the web 1 smoothly through its path.

The transfer of the image need not be to a copy sheet held by the drum 18, but may be directly to the drum surface itself. In this embodiment the drum surface would receive two or more consecutive images in registration and then transfer the multicolor image to another copy sheet at a spot that can be remote from the web 1. According to a further refinement of this embodiment the transfer surface can be in the form of an endless transfer web whose movement is controlled by the transfer sprocket when at the transfer station itself. According to this refinement the endless transfer web also has perforations corresponding to those in electrophotographic web 1. Both sets of perforations are engaged by the teeth on the transfer sprocket when the two webs are in transfer relation.

The printhead sprocket could be replaced by a stationary optical or piezoelectric sensing device. However, this structure is inferior to the sprocket because it gives only instantaneous signals of edge location, while the sprocket continuously engages the edge to be sensed, continually controlling the portion being exposed.

With the amount of wrap that web 1 has around printhead roller 2, driving engagement between the web and the sprocket is assured. However, the transfer roller 18 and the the transfer sprocket 32 are much larger to hold a ledger sized sheet with its long dimension around the circumference of the drum. According to FIG. 5, to keep the web 1 from slipping off the transfer sprocket 32, a backup shoe 50 is positioned behind only the perforation portion of web 1 directly opposite the sprocket 32. A notch or recess 51 in the shoe 50 receives the teeth of sprocket 32 while the shoe itself maintains the web 1 against the sprocket. As mentioned above, the backup roller 20 is slightly upstream of the nip, thereby also forcing some wrap of the web 1 and assisting in maintaining sprocket-perforation contact. The teeth of the sprocket itself should be made as steep as possible, as is well known in the art.

The printhead roller 2 is a fixed two inch (approx. 5 cm) roller. The other rollers 3, 4 and 5 are castered and gimballed in a manner known in the art to maintain substantially equal tension of web 1 throughout. The tension is applied at roller 4. These rollers are shown also as two inch (approx. 5 cm) rollers, but may also be one inch (approx. 2.5 cm) in diameter. Roller 5 is a steering roller with edge guides to control crosstrack movement of the web and crosstrack registration of the images. Alternatively, this roller may have a mechanical or electrical servo which senses the position of the web and tilts roller 5 to control the web's crosstrack position; see, for example, U.S. Pat. No. 4,572,417 to Joseph et al.

The LED printhead is commercially available from a variety of sources and is presently being used as an exposure device for nonimpact printers. It is electronically controlled and emits activating radiation along a line transverse to the direction of motion of the electrophotographic web. Image formation, of course, need not be by LED printhead. Other electronic sources can make equally significant use of this invention, for example, a laser scanning device may be used. Similarly, the process need not be electrophotographic, for example, image formation can be by ion emission, as is well known in the art, thereby eliminating the charging station 7 and greatly simplifying the web 1.

The invention has been described in detail with particular reference to a preferred embodiment thereof, but it will be understood that variations and modifications can be effected within the spirit and scope of the invention as described hereinabove and as defined in the appended claims.

We claim:

1. A nonimpact printer of the type having
   an endless movable web entrained around a series of rollers,
   a printhead positioned to form a series of electrostatic images on said web in response to electronic image information as said web passes said printhead,
   means for controlling the printhead,
   means for toning said electrostatic images to form a series of toner images, and
   transfer means positioned to present a transfer surface repeatedly to said web to transfer and superpose said toner images in registration on the transfer surface; characterized in that
   said web has a series of perforations along one edge,
   said controlling means includes first sensing means for sensing the leading or trailing edge of each perforation as it passes a predetermined position associated with said printhead, and means for controlling actuation of said printhead in response to said sensing means, and
   further characterized by means for controlling presentation of said transfer surface to the toner images, said means including second sensing means for sensing each perforation as it passes a predetermined position associated with said transfer means and means for positioning said transfer surface relative to the toner images in response to sensing of each perforation.

2. A nonimpact printer according to claim 1 wherein said first sensing means includes a printhead sprocket positioned to engage an edge of each perforation as it passes said position associated with the printhead, a tooth of the printhead sprocket engaging said edge substantially until the next tooth engages the same edge of the next perforation and controlling the image formation for a portion of the web associated with the in-track distance between the two edges, and wherein said second sensing means includes a transfer sprocket positioned to engage an edge of each perforation as it passes said position associated with the transfer means, a tooth of the transfer sprocket engaging said edge substantially until the next tooth engages the same edge of the next perforation and controlling the positioning of the transfer surface for a portion of the web associated with the in-track distance between the two edges.

3. A nonimpact printer according to claim 2 wherein the printhead sprocket and the transfer sprocket engage the same edge of the perforations, and the portions of the web for which transfer and exposure are controlled by the engagement with a given edge is the same for each sprocket.

4. A copier or printer according to claim 2 wherein said controlling means includes means for urging the teeth of the printhead sprocket toward the leading edge of each engaged perforation.

5. A copier or printer according to claim 2 wherein said printhead sprocket includes teeth engageable with said perforations and said teeth are permitted to engage the trailing edge of each perforation.

6. A color printer of the type having
   an endless movable electrophotographic web entrained around a series of rollers,
   means for uniformly charging a moving surface of said web,
   means for imagewise exposing said moving surface to form a series of images on said web,
   means for controlling the exposing means,
   means for applying toner of different color to said images, respectively, and
   a transfer drum positioned to present a transfer surface repeatedly to said web to transfer said plurality of images in registration thereto to form a multicolor image; characterized in that
   said web has a series of perforations along one edge,
   said controlling means includes a first sprocket positioned to engage said perforations and movable with said web and means for controlling the exposing means in response to the angular position of said sprocket, and
   said transfer drum includes a second sprocket rotatable therewith and engageable with said perforations to control the position of the transfer surface during transfer of the toner images.

7. A printer according to claim 6 wherein said controlling means includes means for urging the sprocket teeth of said first sprocket toward the leading edge of each engaged perforation.

8. A printer according to claim 6 wherein said controlling means includes means for urging the sprocket teeth of said first sprocket toward the trailing edge of each engaged perforation.

9. A color printer according to claim 6 wherein said exposing means includes an electronically controlled printhead of the type which emits activating radiation along a line transverse to said direction of motion of said web and said controlling means includes means for timing said emission according to the angular position of said first sprocket.

10. A color printer according to claim 6 wherein the pitch of the teeth of the first and second sprockets are substantially the same and the number of teeth on the second sprocket is an integer multiple of the number of teeth on the first sprocket.

11. A color printer according to claim 6 including means for driving the transfer drum to in turn drive the web by engagement between the second sprocket and the leading edge of the perforations.

12. A color printer of the type having
    an endless movable electrophotographic web entrained around a series of rollers, means for uniformly charging a moving surface of said web, means for imagewise exposing said moving surface to form at least two electrostatic images on said web, means for controlling the exposing means according to the position of the web, means for applying toner of different color to said images, respectively, a transfer sheet feeding means, and a transfer drum positioned to receive a transfer sheet from said sheet feeding means and to present a surface of said transfer sheet repeatedly to said web to transfer said images in registration thereto to form a multicolor image; characterized in that said web has a series of perforations along one edge, said controlling means includes a first sprocket positioned to engage said perforations and movable with said web and means for controlling the exposing means in response to the angular position of said sprocket, and said transfer drum includes a second sprocket rotatable therewith and engageable with said perforations to control the position of said transfer sheet relative to the position of the toner images.

13. A color printer according to claim 12 wherein said controlling means includes means for urging the sprocket teeth of said first sprocket toward the leading edge of each engaged perforation.

14. A color printer according to claim 12 including means for driving said transfer drum to in turn drive the web through engagement between the second sprocket and the perforations.

15. A color printer according to claim 12 wherein said exposing means includes an electronically controlled printhead of the type which emits activating radiation along a line transverse to the direction of motion of said web and said controlling means includes means for timing said emission according to the angular position of said first sprocket.

16. A color printer according to claim 12 wherein the pitch of the teeth of the first and second sprockets are substantially the same and the number of teeth on the second sprocket is an integer multiple of the number of teeth on the first sprocket.

17. A color printer of the type having an endless movable web entrained around a series of rollers, means for forming a series of electrostatic images on said web, means for controlling the forming means, means for applying toner of different color to said images, respectively, and a transfer drum positioned to bring a transfer surface repeatedly into transfer relation with said web to transfer said plurality of images in registration thereto to form a multicolor image; characterized in that said web has a series of perforations along one edge, said controlling means includes a first sprocket positioned to engage said perforations and movable with said web and means for controlling the forming means in response to the angular position of said first sprocket, said transfer drum includes a second sprocket having teeth engageable with said perforations, and means for driving said drum to in turn drive the web through engagement between the second sprocket and the perforations.

18. A printer according to claim 17 wherein said transfer drum has means for securing a transfer sheet to the periphery thereof, the transfer surface being the outside surface of a transfer sheet so secured.

* * * * *